United States Patent [19]

Roddy

[11] 4,405,075
[45] Sep. 20, 1983

[54] STRUCTURE FOR ALIGNING AND BUTT-WELDING TUBE ENDS

[75] Inventor: Robert L. Roddy, Chattanooga, Tenn.

[73] Assignee: Combustion Engineering, Inc., Windsor, Conn.

[21] Appl. No.: 262,170

[22] Filed: May 11, 1981

[51] Int. Cl.³ .............................................. B23K 37/06
[52] U.S. Cl. ................................................. 228/49 B
[58] Field of Search ............. 228/49 B, 219; 279/2 R; 269/48.1; 29/271, 272, 263, 283; 72/370, 392; 403/297, 370, 374; 219/72

[56] References Cited

U.S. PATENT DOCUMENTS

| 180,169 | 7/1876 | Tasker | 279/2 |
|---|---|---|---|
| 2,960,342 | 11/1960 | Raper | 279/2 |
| 3,095,844 | 7/1963 | Thielsch | 228/219 X |
| 3,301,108 | 1/1967 | Heiner | 279/2 |
| 3,986,383 | 10/1976 | Petteys | 29/263 X |

FOREIGN PATENT DOCUMENTS 7978 of 1885 United Kingdom ................. 29/263

OTHER PUBLICATIONS

Raymond a Mueller, Jun. 30, 1953, *Welding Apparatus.*

*Primary Examiner*—Nicholas P. Godici
*Assistant Examiner*—M. Jordan
*Attorney, Agent, or Firm*—Arthur L Wade

[57] ABSTRACT

A fixture has an expandable section which is positioned opposite the junction of the two pipe ends. Actuation of the expandable section to the walls of the pipes, internally clamps the pipes into rigid axial alignment for welding the pipe ends together.

1 Claim, 3 Drawing Figures

4,405,075

STRUCTURE FOR ALIGNING AND BUTT-WELDING TUBE ENDS

TECHNICAL FIELD

The present invention relates to clamping two pipes in alignment while their abutting ends are welded together. More particularly, the invention relates to a fixture for internally clamping two tubes in axial alignment while a welding process is performed to join their abutting ends.

BACKGROUND ART

The butt welding of tubes to each other is one of those nasty little problems scattered throughout the welding art. The problem is aggravated by the requirement that the delicate weld of axially aligned tubes at their abutting ends requires gas-shielding of the welding process.

The simplistic approach would appear, superficially, one of inserting a rod down the inside of both tubes to hold the tubes in axial alignment while their ends are spot-welded together. Thereafter, the aligning rod could be extracted and the comparatively delicate gas-shielded welding process could be carried out while the tubes are held in position by their spot welds.

The present requirement is to simplify the foregoing procedure by providing a fixture with which the tubes can be clamped in alignment during the gas-shielded welding process. The elimination of tack welds (manually applied) will provide a more uniform weld due to an automatic welding operation. Provision is required for flowing the inert gas through the tubes as they are clamped in alignment by the fixture. Finally, the fixture is required to be readily insertable and removable in the pipes.

DECLARATION OF THE INVENTION

The present invention provides a fixture having an expandable section which is brought against the internal walls of two abutting pipes to clamp the pipes in rigid axial alignment while being butt welded together.

The invention further provides passageways through which a selected inert gas can be flowed to purge the inside weld area of any undesirable elements. This purging activity is used with certain types of material.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

General

The present invention facilitates the welding of tubes, or pipes, together while their ends abut each other. The terms, tubes or pipes, are to be taken as equivalent. Although not necessarily limited to these materials, these pipes, or tubes, are generally formed of metal. Certain metallic materials require special welding techniques such as gas-shielding processes. The gas is generally inert to prevent the combination of atmospheric oxygen with the weld material which brings the pipes into union.

The present invention is embodied in a fixture which is reusable. The fixture is simply inserted into two pipes and a section of the fixture is expanded to bridge across the abutting ends of the pipes to form an internal clamp with which the pipes are locked into rigid longitudinal alignment. A suitable inert gas is passed through the pipes and to their junction to purge any undesirable elements during the welding process carried on external the pipes.

Figure 1:
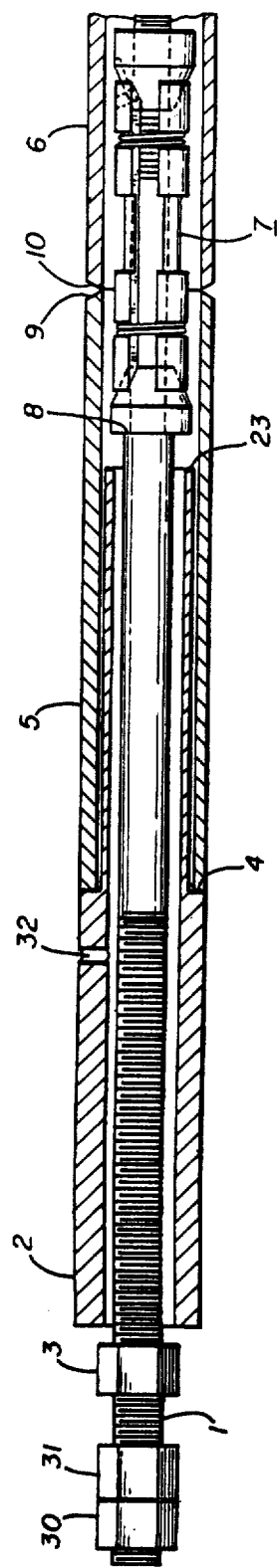
FIG. 1 is a sectioned elevation of two pipes abutted to be held in axial alignment by a fixture embodying the present invention.
Figure 2:
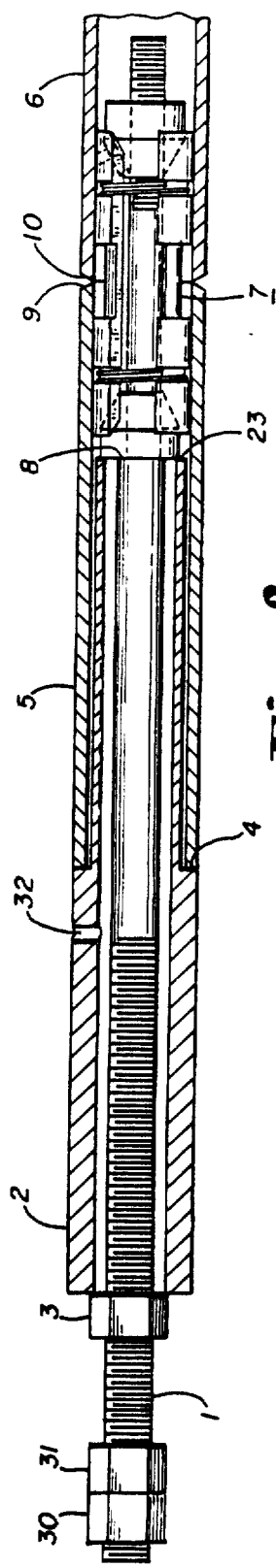
FIG. 2 is the structure of FIG. 1 with the fixture expanded to hold the pipes in position.

In the drawings, FIGS. 1 and 2 disclose the identical structure. The fixture in which the present invention is embodied is represented as having been inserted into place. In FIG. 1, the expandable section of the fixture is disclosed in its collapsed, retracted, or non-expanded position. FIG. 2 discloses the same structure, but with the expandable section of the fixture brought into operative engagement with the internal walls of the abutting pipes so as to bridge the junction between the pipes.

The Assembled Fixture

Reference is to be made to all figures of the drawings in their following description. The base, or central, element of the fixture is threaded rod 1. Sleeve 2 is journaled freely over rod 1 and axially positioned along rod 1 by nut 3, threaded on the left end of rod 1, as viewed in the drawings.

Sleeve 2 has a shoulder at 4 against which the left end of pipe 5 is engaged. Therefore, nut 3 is threaded to an axial position on rod 1 which will establish shoulder 4 of sleeve 2 and abutting pipe 5 at the proper location along rod 1 relative to pipe 6. Expandable section 7 is journaled over rod 1 to abut shoulder 8 on rod 1. Therefore, nut 3 is positioned to place sleeve 2 and pipe 5 so that the end 9 of pipe 5 is, approximately, at the midpoint of expanded section 7. It follows that the end 10 of pipe 6 is brought into abuttment with end 9 of pipe 5 and is also at the midpoint of the expanded section 7.

When section 7 is expanded, as shown in FIG. 2, its segments move radially outward from the axis of rod 1 to engage the internal walls of pipes 5 and 6 and bridge the junction of their ends 9 and 10. The expandable section 7 is, when expanded, a clamp applied internally to the pipes 5 and 6 which holds the pipes in rigid axial alignment. So held, the ends 9 and 10, properly beveled, are thereafter joined together by one or more weld beads.

Expandable Section 7

Expandable section 7 is comprised of 3 segments held in their collapsed position by springs and forced to their expanded position by inclined surfaces. Although the expandable section is viewed in its two operative positions on rod 1 in FIGS. 1 and 2, FIG. 3 is established to more completely disclose this important element of the fixture in its several parts and their relationship to each other.

Figure 3:
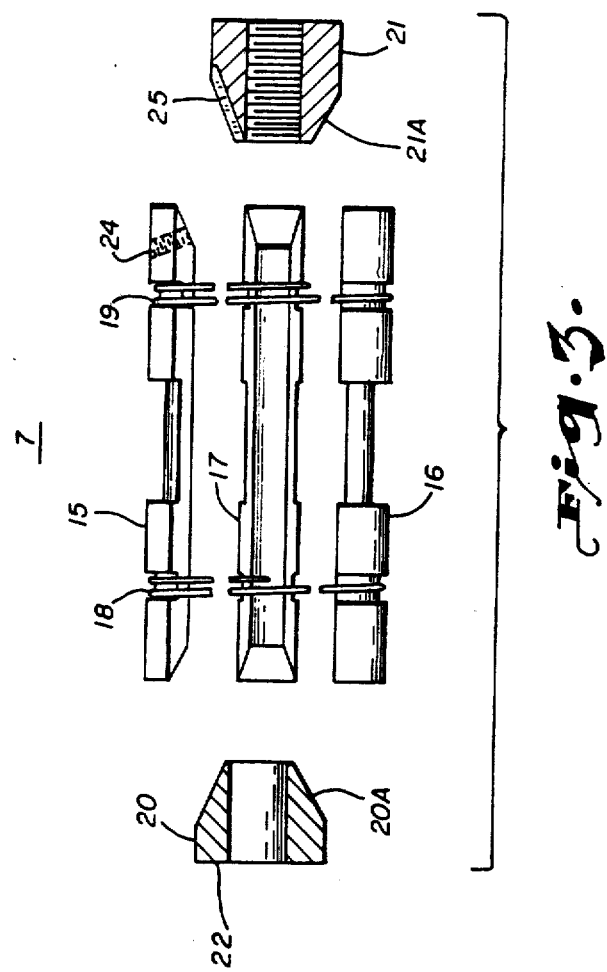
FIG. 3 is an exploded elevation of the expandable section of the fixture.

In FIG. 3, section 7 is disclosed as removed from rod 1 and its parts exploded. Three segments 15, 16 and 17 are held in their collapsed, or nested, position by springs 18 and 19. Drawn together by their springs, the segments form an axial hole by which the segments, as a unit, are journaled over rod 1.

When wedge surfaces, in the form of cones, are forced into opposite ends of the assembly of collapsed segments, the segments will be radially moved against the force of their springs. End cone bodies 20 and 21 provide the conical wedge surfaces. Wedge surface 20a and wedge surface 21a are moved toward each other with the segment assembly between them. The result is that the ends of the segments will be forced up surfaces 20a and 21a, radially displacing the segments equally from their axis. The collapsed position of the segments is disclosed in FIG. 1. The expanded position of the segments is disclosed in FIG. 2. There remains the disclosure of how end cone bodies 20 and 21 are moved toward and away from each other.

The left end 22 of end cone body 20 is positioned against right end 23 of sleeve 2. The internal bore of end cone body 20 is sized to freely journal over rod 1. The bore of end cone body 21 is threaded to engage the threaded right end of rod 1. A pin 24 is mounted on one of the segments 15, 16 and 17 of section 7 to extend into engagement with a groove 25 of end cone body 21. When rod 1 is rotated, end cone body 21 will be held, or anchored, relative to pipes 5 and 6, and the distance between end cone bodies 20 and 21 thereby varied as required to expand section 7, or collapse section 7 with their surfaces 20a and 21a.

In operation, sleeve 2 and expandable section 7 are mounted on rod 1 and inserted into the bores of pipes 5 and 6 so that expandable section 7 is oriented opposite the junction of the abutting ends of the pipes. A transverse pressure manually applied to the external left end of rod 1 will cock the collapsed section 7 up against the sides of the pipe bores and provide the friction necessary for the pin 24 to function as an anchor of end cone body 21 as rod 1 is rotated.

An effective means to provide wrench engagement with rod 1 is provided by nuts 30 and 31. These nuts are threaded on the left end of rod 1 and threadedly jammed together to make union with rod 1. Thereafter, when it is necessary to rotate rod 1, a wrench may be engaged with these jammed nuts 30 and 31 to rotate rod 1.

Inert Gas Flow Provision

It is expected that the required inert gas will be flowed to the weld area through the right end of pipe 6, not shown. Flow of this gas from a source not shown is insured by holes 32 in sleeve 2. The holes are sized empirically to estblish the desired flow rate. The pressure of the gas within the pipes is adjusted to give the flow through the small gap between the abutting ends 9 and 10 which will provide the required purging for the inside weld area. It is not seen as necessary to disclose the welding or details of its formation external the pipes 5 and 6. The fixture embodying the invention is disclosed in its function to provide the fixed relationship of the pipes 5 and 6 for the welding to be subsequently performed. It is not expected that the root of the weld formed will protrude into the internal bores of pipes 5 and 6. Therefore, rotation of rod 1 to collapse section 7 will be carried out after the weld is completed and the complete fixture readily removed from the left end of pipe 5.

Conclusion

It should now be apparent that the embodiment of the invention essentially forms a clamp with which two pipes are held in alignment while their ends are welded together. Of course, it must be mounted on a rod, but the expandable section is the raison d'etre of the embodiment. This expandable section is made up of tough, metallic segments which are radially forced outward from the axis of the pipes to bridge the junction of the pipes and hold them while they are welded.

There is a sleeve over the actuating rod which holds the second end of one pipe into abuttment with one end of the other pipe. But, basically, it is the expandable section which performs the function of clamping the pipes to be welded together.

The method of expanding the section may appear to be somewhat crude, but it is effective. The threaded cone body must be held immobile while the rod is threaded into it. Lateral force can be readily applied to engage the expandable segments against the internal sides of the pipe so they can be linked to the cone body and hold it immobile until the segments of the expandable section are brought into full engagement with the internal sides of the pipes.

Finally, the structure must provide for flow of inert gas through the clamped pipes and fixture. This gas flow must be established so that enough of the gas will flow into the tube and to the weld joint to purge the area of undesirable elements.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. A fixture with which to abutt two pipe sections while they are welded together, including;
   an expandable section comprising,
      a plurality of longitudinal segments arranged to nest together and form a central bore,
      a spring member encircling the nest of segments to retain the segments yieldingly in their nesting relation to each other,
      a first body having an internal bore aligned with that of the nested segments and providing a conical wedge surface inclined in the direction of the nest,
      and a second body having an internally threaded bore aligned with the bore of the nested segments and providing a conical wedge surface inclined in the direction of the nest,
      whereby the movement of the first and second bodies toward the nest engages the nest with their conical wedge surfaces to overcome the spring force to radially move the segments from their bore;
   a threaded rod extended through the axially aligned bores of the first body and the bore of the nest to bring a shoulder on the threaded rod against the first body and into threaded engagement with the second body;
   means for preventing rotation of the second body;

means for rotating the threaded rod in its engagement with the second body threads whereby rotation of the threaded rod in its engagement with the threads of the second body moves the first and second bodies toward and away from each other to alternately expand and contract the expandable section;

a sleeve member with a bore sized to journal the sleeve freely over the threaded rod comprising, means for axially spacing the sleeve member from the expandable section, and a shoulder formed on the sleeve member sized to engage the non-abutting end of one of the pipes;

means for fixing the axial position of the sleeve member along the threaded rod to engage the pipe and sleeve shoulder to bring the other end of the pipe to its junction with the end of the second pipe;

and passageways formed through the sleeve member to establish a flow of inert gas through the pipes.

* * * * *